US006473773B1

(12) United States Patent
Cheng et al.

(10) Patent No.: US 6,473,773 B1
(45) Date of Patent: Oct. 29, 2002

(54) MEMORY MANAGEMENT IN A PARTIALLY GARBAGE-COLLECTED PROGRAMMING SYSTEM

(75) Inventors: Michael Cheng; Tim Scott Hanson; Kim Lawson Rochat, all of Austin, TX (US); Simon Christopher Nash, Stockbridge (GB); Brian Ward Thomson, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/092,737

(22) Filed: Jun. 6, 1998

(30) Foreign Application Priority Data

Dec. 24, 1997 (CA) .............................................. 2225932

(51) Int. Cl.[7] .............................................. G06F 17/00
(52) U.S. Cl. ............... 707/200; 707/103 R; 707/103 Z; 717/116
(58) Field of Search ........................ 707/1–206; 709/10, 709/203, 312–317; 717/114–118, 136–140

(56) References Cited

U.S. PATENT DOCUMENTS 6,029,175 A * 2/2000 Chow et al. ................. 707/200

OTHER PUBLICATIONS

Cattell et al., Object Database Standard: ODMG 2.0, 1997, pp. 130–131.*
Stroustrup, C + + Programming Language, 1986, 1987, pp. 184–188.*

* cited by examiner

Primary Examiner—David Jung
(74) Attorney, Agent, or Firm—Ronald L. Drumheller (57) ABSTRACT

Memory management to support calls between objects in language environments support automatic garbage collection and language environments requiring explicit control of object destruction is provided. Reference counting is used to automatically control the lifetime of objects requiring explicit destruction and that are to be accessible across the language boundary. A data structure is maintained in a runtime component for each object that is accessed over a language boundary. The reference count for each non-garbage collected object is incremented by the runtime in accordance with the number of cross-language references held to it. When the count reaches zero through decrements as the references are returned and destroyed, the non-garbage collected object can be safely and automatically destroyed. The runtime creates a strong reference to any garbage collected object accessed by a cross-language call. The reference is visible to the garbage collector, and prevents the object being collected while the reference is in existence.

19 Claims, 8 Drawing Sheets

MEMORY MANAGEMENT IN A PARTIALLY GARBAGE-COLLECTED PROGRAMMING SYSTEM

FIELD OF THE INVENTION

This invention relates generally to the field of mixed programming environments, and provides, in particular, mechanisms for combining memory management disciplines and for managing object instances in a mixed programming environment.

BACKGROUND OF THE INVENTION

Modem operating systems and hardware platforms make available increasingly large addressable or dynamic memory spaces. Modem applications have correspondingly grown in size and complexity to take advantage of this available memory. Most applications today use a great deal of dynamic memory. Features such as multitasking and multi threading increase the demands on memory.

Where there isn't enough space in dynamic memory for an application to execute, execution time is considerably slowed down while data that another application is referencing is swapped out of dynamic memory to make room for the currently executing thread or process. Object oriented (OO) programming languages such as C++, in particular, use dynamic memory much more heavily than comparable serial programming languages like C, often for small, short-lived allocations.

The effective management of dynamic memory, to locate useable free blocks and to deallocate blocks no longer needed in an executing program, has become an important programing consideration.

The C and C++ languages use the memory allocation function malloc to manage the dynamic memory space. Malloc is a library function defined under the ANSI C standard, and in its usual form, it is a list of free blocks of memory. To allocate a specified number of bytes of memory for a process, the list is searched linearly until a suitably-sized block of free memory is located, and a pointer is returned to identify the address of the newly allocated block. A corresponding deallocation is made using the function free. This causes the space pointed to by the pointer to be deallocated and put back into the list of free memory.

There are modifications and additional allocation and deallocation functions that can be used, examples of which are discussed in:

"Advanced Programing in the UNIX® Environment", W. Richard Stevens, 1992, Addison Wesley Publishing Co.; and "Rethinking Memory Management", Arthur D. Applegate, *Dr. Dobb's Journal*, June 1994, pp. 52–55.

However, for the most part, memory management under C and C++ is handled explicitly, for the reasons discussed below.

Contrasted with this is the implicit form of memory management to make excess memory available without having to run a deallocating routine. This is generally referred to as "garbage collection", and is used in a number of interpreted OO programming languages such as Lisp, Smalltalk and Java.

C++ is a compiled OO language. Some of the differences between compiled and interpreted OO languages, as well as the differences between OO and serial programming technology are discussed in two co-pending Canadian Patent Applications, No. 2,204,971 titled "Uniform Access to and Interchange Between Objects Employing a Plurality of Access Methods" (IBM Docket No. CA997-013) and No. 2,204,974 titled "Transparent Use of Compiled or Interpreted Objects in an Object Oriented System" (IBM Docket No. CA997-014), which are commonly assigned.

Reference counting is a technique used to provide automatic garbage collection in some language implementations (for example, Lisp), and is also sometimes used explicitly by programmers in languages such as C++ that do not provide implicit garbage collection, in order to achieve a similar effect in that language domain. Embedded in each object is an integer field called a reference count. Whenever a reference to the object is duplicated, this count is required to be incremented. Conversely, when a reference is discarded or replaced by a reference to some other object, the count is required to be decremented. By means of this counting discipline, which may be enforced by the language implementation itself (as in the case of Lisp language) or by the programmer (as when this technique is used in C++), the reference count field indicates how many references exist to the object. If, after decrementing the count, it is found to have reached zero, then that object is known to be unreferenced and its storage can be freed.

Although reference counting has advantages of simplicity and scalability, it does not deal well with data structures containing circular references. These are collections of objects containing references to one other, such that the reference counts of all objects in the collection are nonzero even though the executing application no longer holds a reference to any of them and will not access them. Reference counting will not discover that these objects are garbage.

A block of memory is implicitly available to be deallocated or returned to the list of free memory whenever there are no references to it. In a runtime environment supporting implicit memory management, a garbage collector usually scans the dynamic memory from time to time looking for unreferenced blocks and returning them. The garbage collector starts at locations known to contain references to allocated blocks. These locations are called "roots". The garbage collector examines the roots and when it finds a reference to an allocated block, it marks the block as referenced. If the block was unmarked, it recursively examines the block for references. When all the referenced blocks have been marked, a linear scan of all allocated memory is made and unreferenced blocks are swept into the free memory list. The memory may also be compacted by copying referenced blocks to lower memory locations that were occupied by unreferenced blocks and then updating references to point to the new locations for the allocated blocks. Because scanning collectors determine which objects are actually reachable, they are not fooled by circular references and will collect those objects when they are garbage.

Serious problems can arise if garbage collection of an allocated block occurs prematurely. For example, if a garbage collection occurs during processing, there would be no reference to the start of the allocated block and the collector would move the block to the free memory list. If the processor allocates memory, the block may end up being reallocated, destroying the current processing. This could result in a system failure.

Applications that use garbage collection sometimes need to defeat the collection mechanism in controlled ways in order to achieve a particular desired effect. A weak reference to an object is a reference that is intentionally overlooked by the garbage collection mechanism, with the result that an object will be considered garbage and subject to collection if it is unreferenced, or if it is reachable only through weak references. Ordinary references are considered by the garbage collector and are sometimes called strong references to distinguish them from the weak variety.

One use of weak references is to break circular reference chains. Another use is in implementing an instance manager, which is a software module that keeps track of the instances of a particular class or group of classes. The instance manager needs to hold a reference to each object in order to locate it, but it is not the intent that these references alone should prevent the objects from being garbage collected. These requirements can be met by having the instance manager hold weak references to the objects.

The destruction of an object and reclamation of its storage is often preceded by a finalization step, in which user-defined code associated with the object is executed so as to give it an opportunity to "clean up" before it is destroyed. This corresponds to the execution of destructor methods in C++.

The Java language requires that when the garbage collector has determined that an object is unreferenced, it must first execute the finalize( ) methods defined for that object before reclaiming its storage. If, after the object has been finalized, it is subsequently found to still be unreferenced, its storage may be immediately reclaimed. However, Java also permits that the user-defined finalize( ) methods may result in the creation of a new strong reference to the object; if this occurs, the storage for the object will not be reclaimed. Only when the object is found to be unreferenced for a second time, after finalization, will it be reclaimed. This behaviour is called finalization with resurrection, since an apparently 'dead' object comes back to life.

Safe garbage collection cannot be easily achieved in programming languages such as C and C++ which permit the liberal use of indirect calls through pointer references Pointer references are particularly useful in complex programs where the exact number of elements in different data structures may not be ascertainable at compilation time. The number may vary with the program's actions as it is running. The use of pointer references allows individual pieces of storage to be allocated as needed, so that the required amount of storage is available at any given moment during program execution. Legacy C and C++ systems do not permit garbage collection as an automatic feature. One reason is that without a specific mechanism to deal with indirect references, garbage collection in these environments is difficult to implement. Current C++ implementations require explicit user control of the lifetime of objects.

The different programming languages mentioned above have been developed to support different types of applications. Users have become accustomed to having available increasingly rich applications. To reduce development time and cost, application developers want to be able to re-use code, in whatever language or programming environment it has been developed, and they want to be able to take advantage of the functionality offered in one environment, across several. Application developers want to have available to them the option of making cross-language function calls or method invocations.

This is particularly the case with Java, a programming environment that facilitates network communication (such as over the Internet) through a medium called bytecode. All applications can be written or re-written in Java for translation to the bytecode medium, but at great development and migration expense to the users that depend on them for day-to-day operations. Many of these existing applications are already in an OO programming language operating under the same general principles as Java. The ideal is to permit cross-language calls to access the data objects constructed in other language environments. The above-referenced application titled "Uniform Access to and Interchange Between Objects Employing a Plurality of Access Methods" (IBM Docket No. CA997-013) describes a system that supports both local and remote calls across OO languages.

In such a system, a problem arises when a call originates from a programming environment that supports automatic garbage collection, such as Java, to an environment that requires explicit memory release, such as C++. The call from the Java environment has the effect of constructing the data object in the C++ environment. On destruction of the Java handle, there is no way to pass a message to release the memory occupied by the C++ data object because C++ does not recognise the garbage collection mechanism. Similarly, the remote Java user does not have access to the C++ mechanism to explicitly release the memory.

Therefore, a programming model that manages memory correctly across the language boundary is needed.

SUMMARY OF THE INVENTION

It is an object of the present invention to provide an environment in which composite objects can be safely constructed over garbage collected and non-garbage collected environments in a manner to avoid untimely object destruction.

It is also an object of the present invention to correctly detect unreferenced objects in a computer program environment that includes both reference counting and garbage collection memory management domains, and where object references may be held in one domain to objects resident in the other domain.

A further object of the present invention is to activate a prescribed storage management function on an object when that object is detected to be unreferenced.

It is also an object of the present invention to provide distinguished references to objects and to correctly detect when all remaining references to a particular object are distinguished references, and to activate a prescribed storage management function on said object at the time of said detection.

Accordingly the present invention provides a cross-language memory management system for use over an object oriented programming in which there is at least an explicit memory management domain with reference counting and an implicit memory management domain. This system includes an interface mechanism that operates to connect the explicit memory management domain and the to implicit memory management domain. The interface mechanism is adapted to detect cross-language references intended for implementation objects in each domain and, in the case of any implementation object targeted by at least one cross-language reference, it maintains at least one strong reference to that implementation object.

Preferably, the interface mechanism, for any implementation object targeted by a cross-language reference, consists of a reference object containing a reference count of cross-language references intended for that implementation object. While the reference count is non-zero, the reference object is adapted to maintain a strong reference to the implementation object.

In another embodiment, the invention provides a mechanism to control object destruction in an object oriented programming environment permitting cross-language invocations from an explicit memory management domain having reference counting to an implicit memory management domain. In this embodiment, the mechanism consists of means to pass a strong reference from a calling object in the explicit memory management domain to an implementation object in the implicit memory management domain, and means to destroy the strong reference on destruction of the calling.

The invention also provides a mechanism to control object destruction in the converse situation, the invocation of an implementation object in an explicit memory management domain having reference counting by a calling object in an implicit memory management domain. In this embodiment, the mechanism consists of means to increment a reference count in the implementation object, means to return a weak reference to the calling object, and means to decrement the reference count on destruction of the calling object.

In addition, the invention provides a method, and corresponding computer program product embodying means to program a general purpose computer to carry out the method, of implementing cross-language calls between objects in explicit memory management domains supporting reference counting and implicit memory management domains support garbage collection. The method includes the steps of invoking a method for the call on a proxy object permitting cross-language access, converting the method to a language-independent token having a reference count of at least one, selecting a pointer for invoking an implementation side mechanism, and receiving a return value at the client.

Finally, the invention provides a composite object constructed over at least first and second object oriented language environments. The composite object is constructed with a class hierarchy in the first environment having a proxy base class and at least one derived implementation object, a class hierarchy in the second environment having a base implementation class and at least one proxy derived class, an interface mechanism adapted to detect a cross-language reference from proxy class in the composite object and to select a pointer to a corresponding implementation class. When a method invoked on the composite object in one of the language environments executes on a proxy class, that proxy class invokes a cross-language method on its corresponding implementation class in the second environment.

BRIEF DESCRIPTION OF THE DRAWINGS

Embodiments of the invention will now be described in detail in association with the accompanying drawings, in which.

DETAILED DESCRIPTION OF THE PREFERRED EMBODIMENTS

The preferred embodiments of the present invention have been implemented in a programming environment where the reference counting memory management domain is defined by the C++ language mapping of the Object Management Group's Common Object Request Broker Architecture (OMG CORBA) version 2.0, and the garbage collection memory management domain is defined by the Java programming language. References between the two languages are effected through proxy objects and a runtime component that provides a language-independent object token for each object made available for cross-language access, as fully described in the above-referenced Canadian Application No. 2,204,974 (IBM Docket No. CA997-014).

However, from reviewing this disclosure, it will become clear to one skilled in the art that the present invention is useful in any object oriented programming environment that contains reference counting memory management domains and garbage collection memory management domains, and where the garbage collection memory management domains provide weak references and finalization with resurrection.

Figure 1:
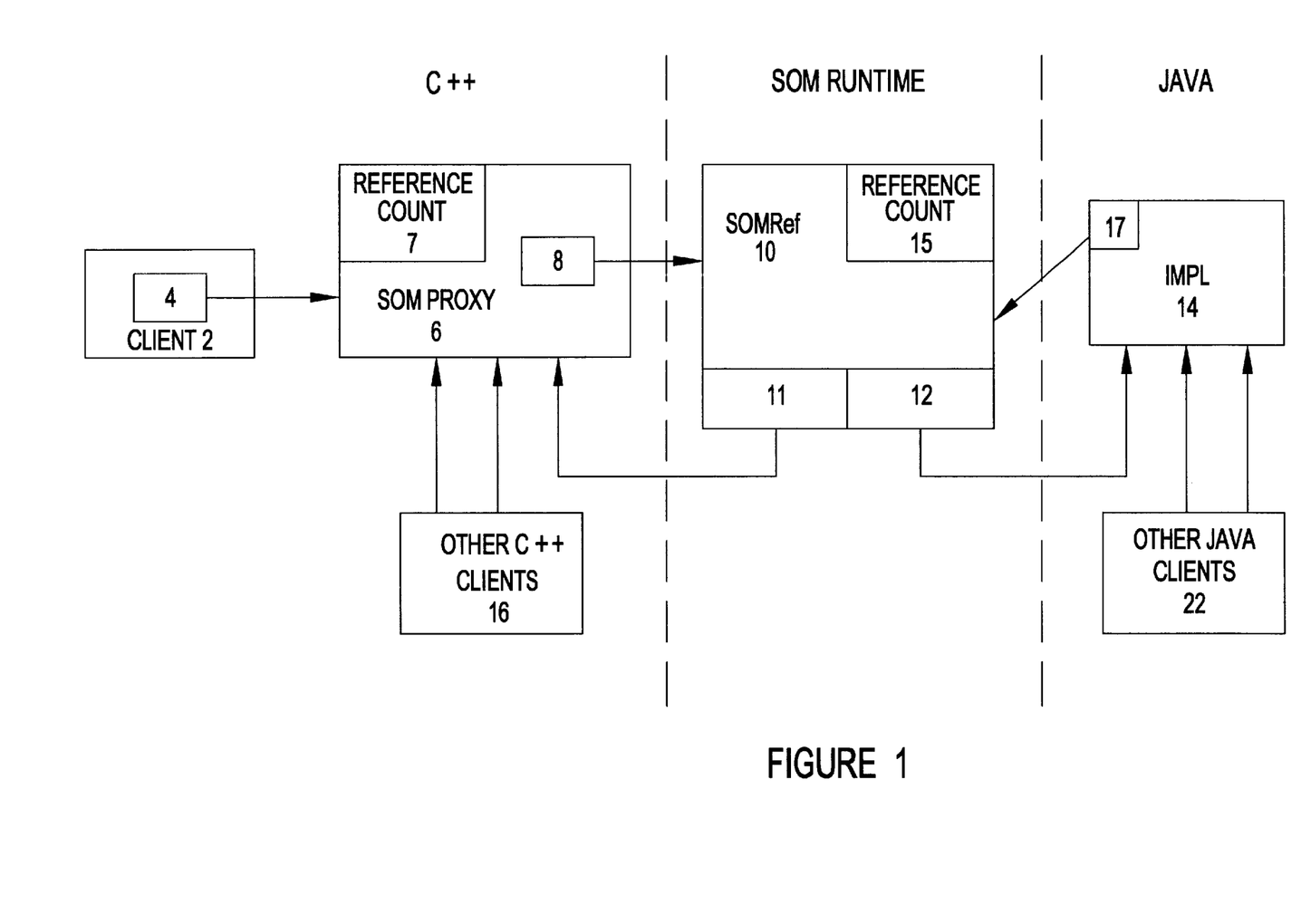
FIG. 1 is a schematic diagram illustrating the interfaces between a client in an explicit memory management domain and a cross-language object in a garbage-collected domain, according to one aspect of the invention.

FIG. 1 illustrates schematically the operation of the preferred embodiment of the present invention in relation to an object 14 implemented in a garbage collection memory management domain. In the preferred embodiment, a C++ client program 2 uses a pointer 4 to a C++ proxy object or "SOM proxy" 6. The proxy object 6 in the C++ domain is connected to the implementation 14 in the Java domain. In the preferred implementation, this connection occurs through an intermediary SOMRef object 10 which holds a reference to the Java implementation object from outside the Java domain, and which is created for this purpose on demand in the SOM Runtime component, as fully described in the above-referenced application on "Transparent Use of Compiled or Interpreted Objects in an Object Oriented System" (IBM Docket No. CA997-014). However, from reviewing this disclosure, it will become clear to one skilled in the art that the present invention is equally applicable in embodiments where the intermediary object is omitted and the C++ proxy holds a direct reference to the Java implementation.

The proxy object 6 in the C++ domain contains a pointer 8 to the "SOMRef" 10, which is a language-independent token. The SOMRef 10 contains a reference 12 to the implementation object 14 in the garbage collected Java domain. In the preferred embodiment, to avoid unnecessary proliferation of proxies the SOMRef contains a set of pointers 11 to existing proxy interfaces. It is not required that all proxies be pointed to by this set. Each pointer is tagged with an identifier of the programming language of the proxy and of the name of the object interface that it represents. This permits increased reuse of existing proxies instead of creating new ones.

Other C++ client programs 16 may use the same C++ proxy object 6. In the prior art, memory management of the C++ proxy is accomplished through explicit reference counting, and therefore included in the instance data of the C++ proxy object 6 is an integer reference count 7. The reference count 7 is maintained through explicit action on the part of the C++ client. When a new pointer to the proxy is created by the execution of code in the C++ client, the client code is required by convention to increment the value in the reference count field 7. When a pointer to the proxy is destroyed by the execution of code in the C++ client, the client code is required by convention to decrement the value in the reference count field 7. If this causes the value of the reference count to reach zero, a disposal function is executed on the proxy object to reclaim its storage.

According to the preferred embodiment, a reference count 15 is added to the SOMRef 10, and a discipline is imposed on the proxies which refer to it, to ensure that the reference count indicates the number of C++ proxies that refer to the SOMRef 10 at any time. This discipline is discussed in relation to FIGS. 2 and 3. The pointers to SOM proxies, contained in the set of such pointers 11, are constituted as C++ weak references and their creation and destruction does not affect the reference count 7 in the SOM proxy. The reference 12 contained in the SOMRef and referring to a Java implementation is a strong Java reference and, while it continues to exist, prevents the garbage collection of that Java implementation.

Additionally, the Java implementation object 14 contains a weak reference 17 back to its corresponding SOMRef 10, if one has been created. Java objects for which there is no corresponding SOMRef contain a null reference in field 17.

As known in the prior art, the Java implementation object 14 may be referenced by other Java language clients 22. Memory management of Java objects is accomplished through garbage collection, effected by a garbage collector component of the Java execution environment. The garbage collector component finds Java objects that are not accessible either directly or indirectly from the Java execution stack, not accessible from any named Java object, and not accessible from any strong reference held outside the Java environment.

Figure 2:
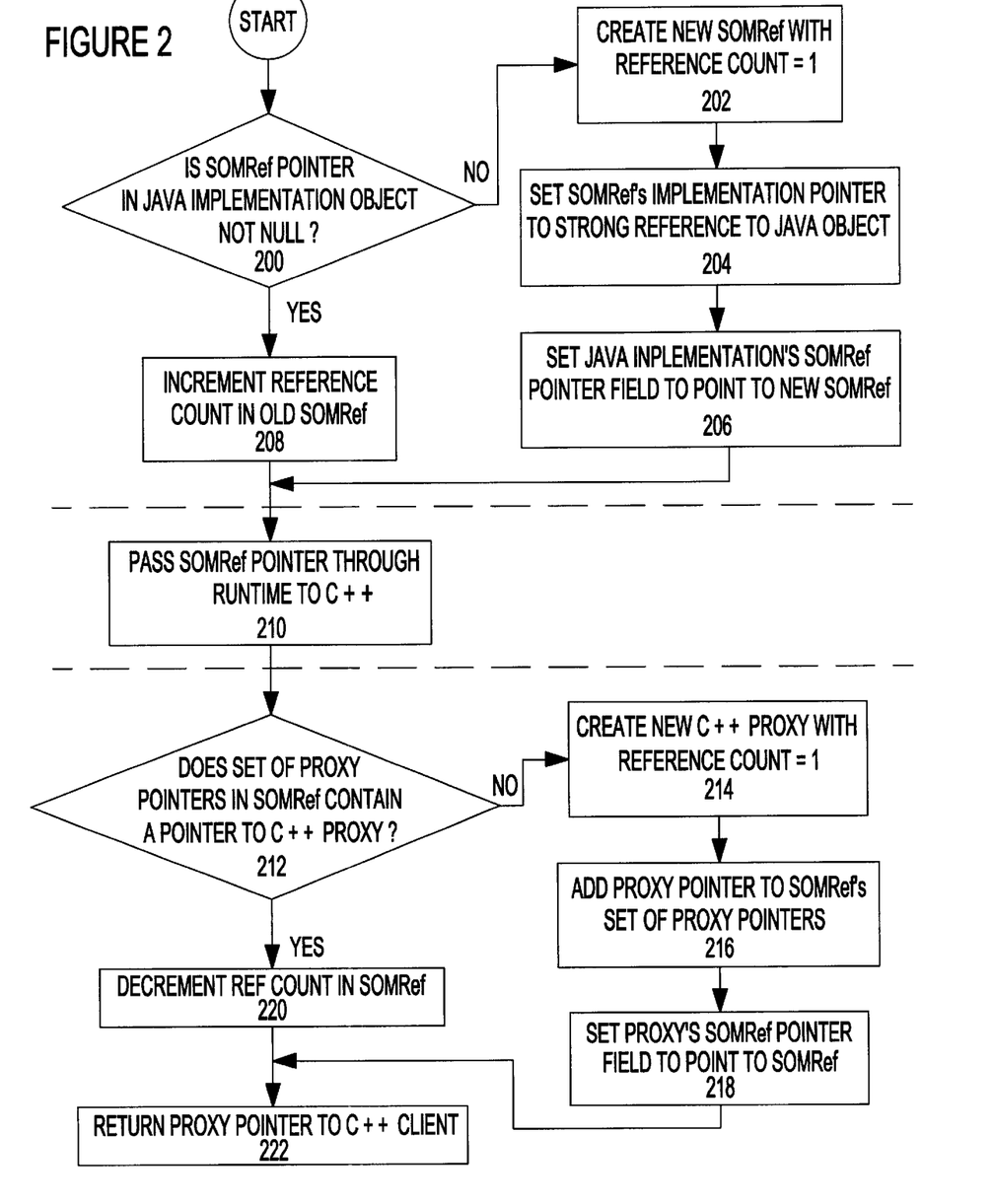
FIG. 2 is a flow diagram illustrating the steps for invoking a method over the cross-language environment illustrated in FIG. 1.

The structure in FIG. 1 is created whenever a reference to a Java implementation object 14 is passed from the Java domain to the C++ domain, such as when a method called on some other Java object (not shown) returns an object reference as its result value. FIG. 2 is a flow diagram that sets forth the process by which the reference is translated to C++ and the structure in FIG. 1 created. In overview, blocks 200–208 of FIG. 2 are executed in the Java domain, and produce a SOMRef pointer which is then passed through the SOM runtime to the C++ side (block 210). Blocks 212–222 are then executed in C++, and either locate an existing C++ SOM proxy or, if none such can be found, create one.

Referring in detail, principally to FIG. 2, first the SOMRef pointer field (17 in FIG. 1) of the Java object is inspected (block 200). If that field is non-null, then it locates an existing SOMRef (10 in FIG. 1) whose reference count field (15 in FIG. 1) is incremented (block 208). Otherwise, a new SOMRef is created with reference count equal to 1 (block 202), a strong reference to the Java implementation is stored (block 204) in the implementation pointer field (12 in FIG. 1) of the SOMRef, and a reference to the SOMRef is also stored (block 206) into the Java implementation's SOMRef pointer field (17 in FIG. 1). At this point a SOMRef has either been located or created, whose implementation pointer field (12 in FIG. 1) refers to the Java implementation object (14 in FIG. 1). Also, the SOMRef pointer field (17 in FIG. 1) in the Java implementation object refers back to said SOMRef.

A pointer to this SOMRef is now passed through the SOM Runtime to the C++ code (block 210). The SOMRefs collection of proxy pointers (11 in FIG. 1) is then inspected to determine whether it already contains a pointer to an appropriate C++ proxy object (block 212). If not, then a new C++ proxy object of the correct type is created and its reference count field (7 in FIG. 1) is set to the value 1 (block 214), a pointer to the newly created proxy is stored in the SOMRefs collection of proxy pointers (block 216), and the new proxy's SOMRef pointer field (8 in FIG. 1) is set to refer to the SOMRef (block 218). However, if an existing appropriate C++ proxy object was found in block 212, then the reference count field of the SOMRef (15 in FIG. 1) is decremented to reflect the fact that the creation of a new proxy object that was anticipated back in block 208 did in fact not occur.

Referring directly back to FIG. 1, it can be seen that the present invention achieves that following. New SOMRefs are created with their reference counts initially set to one, and existing SOMRefs have their reference counts incremented by one, in anticipation of a new C++ proxy being created that will refer to them. If a new C++ proxy is not subsequently created, because an existing one can be located and reused, then the SOMRef reference count is decremented to reflect the fact that the anticipated new proxy was not created. In this way the SOMRef reference count is guaranteed to be greater than zero while the SOMRef is in transit from the Java to C++ domain, and therefore the SOMRef will not be disposed of during this time, but at the end of the procedure of FIG. 2 the SOMRef reference count accurately counts the C++ proxies that refer to it.

Figure 3:
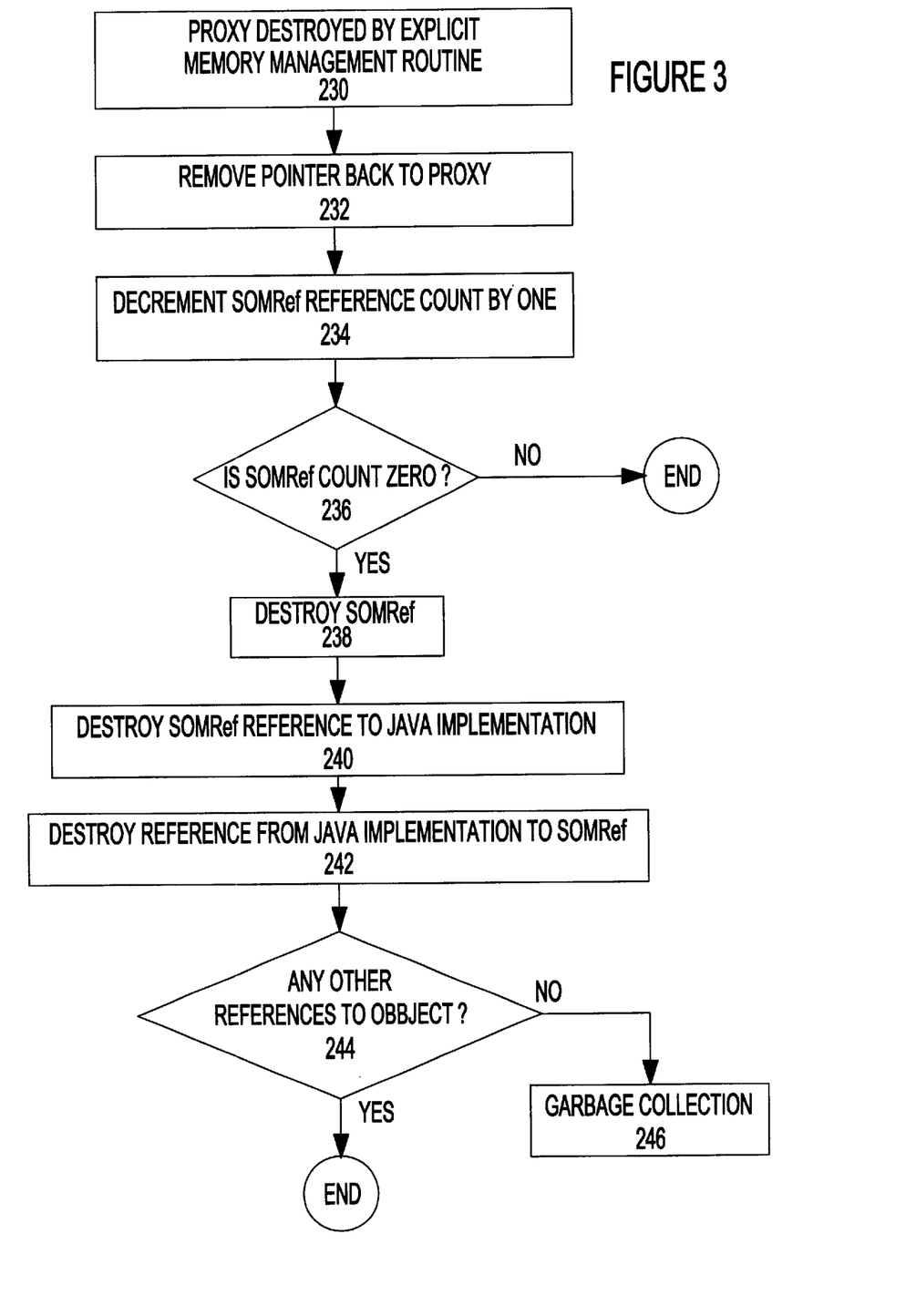
FIG. 3 is a flow diagram illustrating the steps for using reference counting to relay explicit object destruction to a garbage-collected domain, such as Java.

FIG. 3 illustrates the process by which the structure in FIG. 1 is destroyed. As previously described, in relation to the prior art, when a C++ client (2 in FIG. 1) releases its reference (4 in FIG. 1) to the C++ proxy object (6 in FIG. 1) it decrements the proxy's reference count (7 in FIG. 1) and, if that count reaches zero, destroys the proxy object (block 230). This action invokes the C++ destructor function of the SOM proxy, which removes the weak reference back to the proxy from the SOMRef s set of proxy pointers (11 in FIG. 1) (block 232) and also decrements the SOMRef reference count (15 in FIG. 1) (block 234). When the reference count of the SOMRef (15 in FIG. 1) is reduced to zero (block 236), the SOMRef is destroyed (block 238), its strong reference to the Java implementation (12 in FIG. 1) is also destroyed (block 240), and the reference (17 in FIG. 1) from the Java object back to its SOMRef is reset to null (block 242).

Also within the scope of this invention is a variant on this procedure in which the SOMRef is not immediately destroyed, but the reference (12 in FIG. 1) it contains to the implementation is converted from a strong reference to a weak reference. The SOMRef is then later destroyed when the Java object is garbage collected, or when available storage in the SOM runtime becomes low and it is deemed desirable to reclaim idle SOMRefs. The SOMRef may also be revived and reused, by making its Java object reference strong once again, if a reference to the Java object is passed out to C++ again.

In the case of either variant, the SOM runtime no longer holds any strong reference to the Java object so, as in the prior art, if there are no other strong references to it, for example from other Java objects (block 244), the Java implementation can be garbage collected (block 246).

Figure 4:
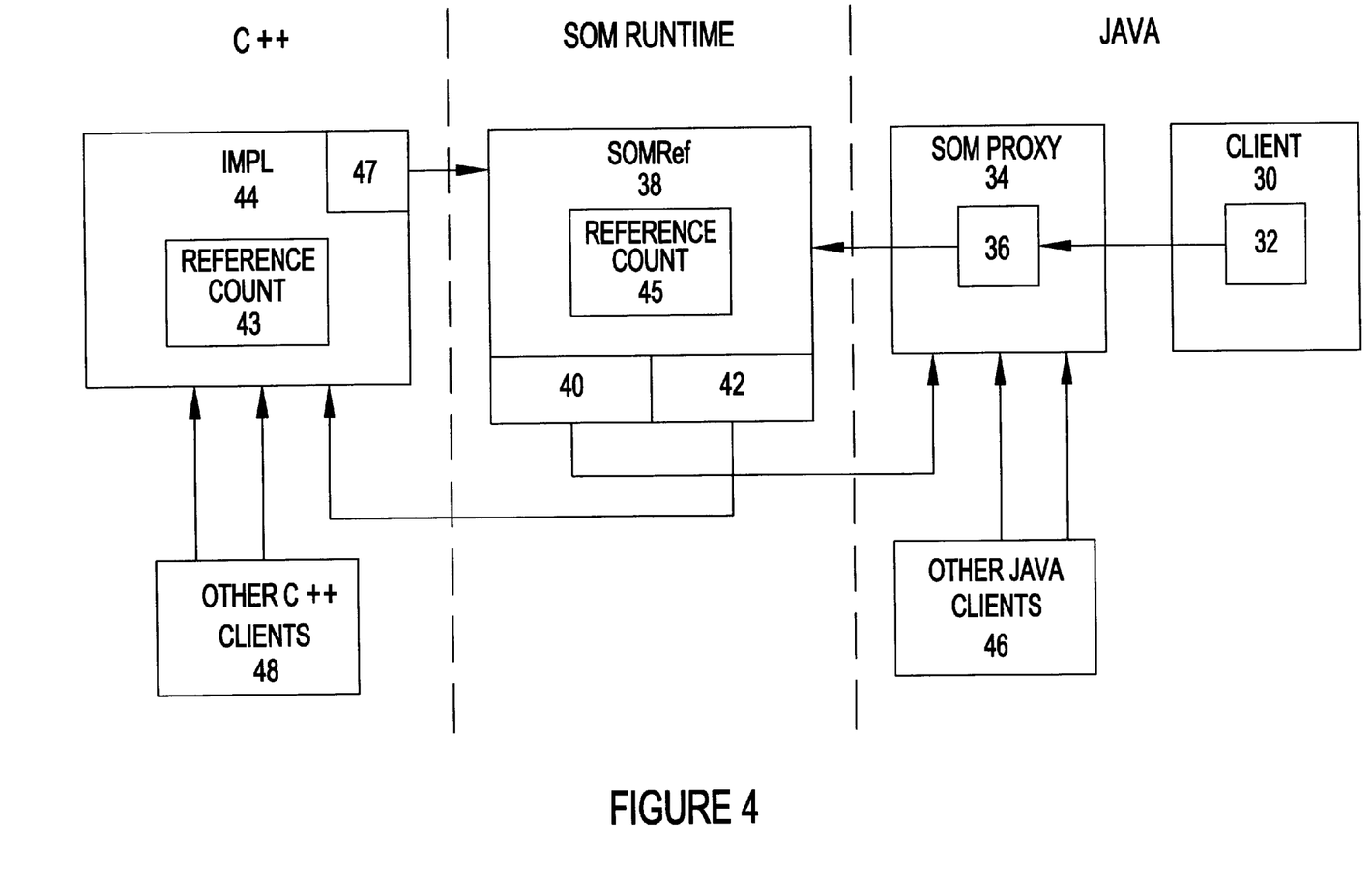
FIG. 4 is a schematic diagram similar to FIG. 1, but illustrating the interfaces between a client in a garbage-collected domain and a cross-language object in a domain with reference counting for explicit memory management.

FIG. 4 schematically illustrates the operation of the preferred embodiment of the present invention in relation to an object implemented in a reference counting memory management domain. In the preferred embodiment, a Java client program 30 uses a reference 32 to a Java proxy object or SOM proxy 34, which in turn contains a pointer 36 to the language-independent token or "SOMRef" 38. The SOMRef 38 contains a reference 42 to the implementation object 44 in the reference counting C++ domain. The C++ implementation object 44 also contains a reference 47 back to the SOMRef 38. The SOMRef also contains a set of pointers 40 to its proxies to permit the existing proxies to be re-used. This set will include a pointer to the Java proxy 34.

Other Java client programs 46 may use the same Java proxy object 34. As in the prior art, memory management of the Java proxy is accomplished through garbage collection, and therefore no reference counts are used.

Also as in the prior art, memory management of the C++ implementation object 44 is accomplished through reference counting, and therefore included in the instance data of the C++ implementation 44 is an integer reference count 43.

However, in the preferred embodiment of the present invention, a reference count 45 is added to the SOMRef 38, and a discipline is imposed on the proxies which refer to the SOMRef from the garbage-collected domain, in order that the reference count indicates the number of proxies that refer to the SOMRef at any time. This discipline consists of essentially the same elements as previously presented in FIGS. 2 and 3, but with the roles of the C++ and Java domains interchanged. This is illustrated in the flow diagrams of FIGS. 5 and 6 and described below.

The reference count 45 in the SOMRef 38 again reflects the number of proxies that refer to it, plus the number of proxies whose imminent creation is anticipated. The set of back pointers to proxies 40 is again a set of weak references, and do not prevent the Java garbage collector from collecting a Java SOM proxy that is otherwise unreferenced. When a Java SOM Proxy is so collected, its finalize ( ) method executes, which decrements the reference count 45 in the SOMRef and also removes the pointer to the proxy from the SOMRef s set of proxy pointers 40.

The SOMRefs pointer 42 to the C++ implementation is a strong reference, as was the corresponding pointer 12 in FIG. 1. In this case, the consequence is that the presence of pointer 42 is reflected in the value of the reference count field 43 in the C++ implementation object 44. The C++ implementation object also contains a weak reference 47 back to the SOMRef.

The structure in FIG. 4 is created whenever a reference to an object implemented in the C++ domain is passed into the Java domain. This may occur, for example, when a reference to the C++ object is a parameter or a return value of a method call.

Figure 5:
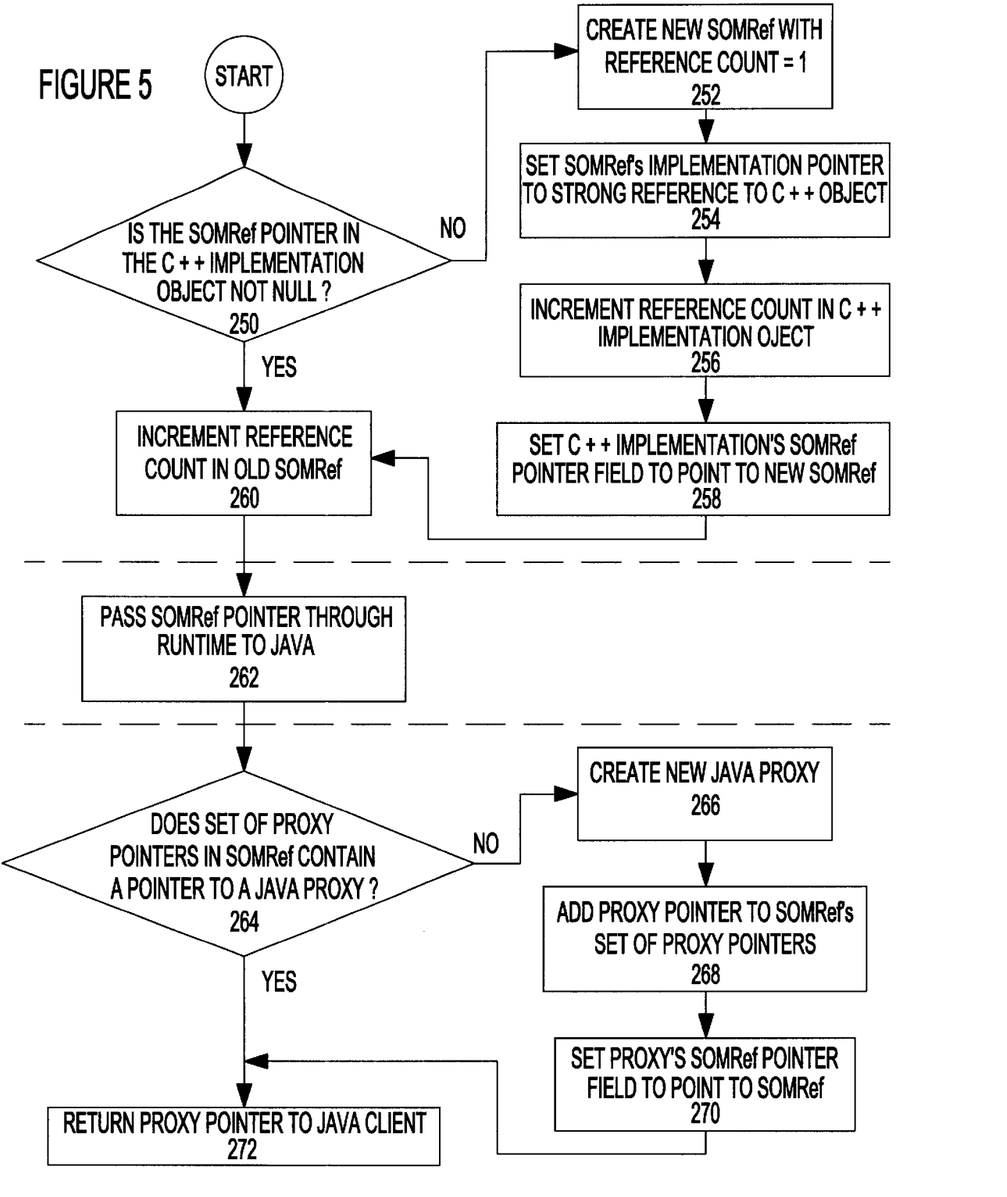
FIGS. 5 and 6 are flow diagrams, similar to FIGS. 2 and 3, illustrating the steps for using reference counting to control the lifetime of an object in an explicit memory managed OO language when referenced from a garbage-collected language, such as the cross-language environment illustrated in FIG. 4.

FIG. 5 is a flow diagram that represents the process by which the reference is translated to Java and the structure in FIG. 4 created.

In overview, blocks 250–260 of FIG. 5 are executed in the C++ domain, and produce a SOMRef pointer which is then passed through the SOM runtime to the Java side (block 262). Blocks 264–272 are then executed in Java, and either locate an existing Java proxy or, if none such can be found, create one.

Referring in detail principally to FIG. 5, the weak reference (47 in FIG. 4) of the C++ object is inspected (block 250) and, if non-null, locates an existing SOMRef (38 in FIG. 4). The reference count of the SOMRef (45 in FIG. 4) is incremented (block 260) in anticipation of a new proxy being created which will refer to it. Otherwise, if the weak reference was null, then a new SOMRef is created with reference count equal to 1 (block 252), a strong reference to the C++ object is stored (block 254) in the implementation pointer field (42 in FIG. 4) of the SOMRef, and the reference count (43 in FIG. 4) of the C++ object is incremented (block 256) to reflect this new strong reference. A weak pointer to the new SOMRef is stored (block 258) in the C++ object (47 in FIG. 4).

At this point a SOMRef has either been located or created, whose implementation pointer field (42 in FIG. 4) refers to the C++ implementation object (44 in FIG. 4). Also, the SOMRef pointer field (47 in FIG. 4) in the C++ implementation object refers back to said SOMRef.

A pointer to this SOMRef is now passed through the SOM Runtime to the Java code (block 262). The SOMRef s collection of proxy pointers (40 in FIG. 4) is then inspected to determine whether it already contains a pointer to an appropriate Java proxy object (block 264). If not, then a new Java proxy object of the correct type is created (block 266), a pointer to the newly created proxy is stored (block 268) in the SOMRef s collection of proxy pointers (40 in FIG. 4), and the new proxy's SOMRef pointer field (36 in FIG. 4) is set to refer to the SOMRef (block 270). However, if an existing appropriate C++ proxy object was found in block 264, then the reference count field of the SOMRef (45 in FIG. 4) is decremented to reflect the fact that the creation of a new proxy object that was anticipated back in block 260 did in fact not occur.

Just as discussed above, when referring directly back to FIG. 4, it can then be seen that this embodiment of the present invention achieves that following. New SOMRefs are created with their reference counts initially set to one, and exiting SOMRefs have their reference counts incremented by one, in anticipation of a new Java proxy being created that will refer to them. If a new Java proxy is not subsequently created, because an existing one can be located and reused, then the SOMRef reference count is decremented to reflect the fact that the anticipated new proxy was not created. In this way the SOMRef reference count is guaranteed to be greater than zero while the SOMRef is in transit from the C++ to Java domain, and therefore the SOMRef will not be disposed of during this time, but at the end of the procedure of FIG. 5 the SOMRef reference count accurately counts the Java proxies that refer to it.

Figure 6:
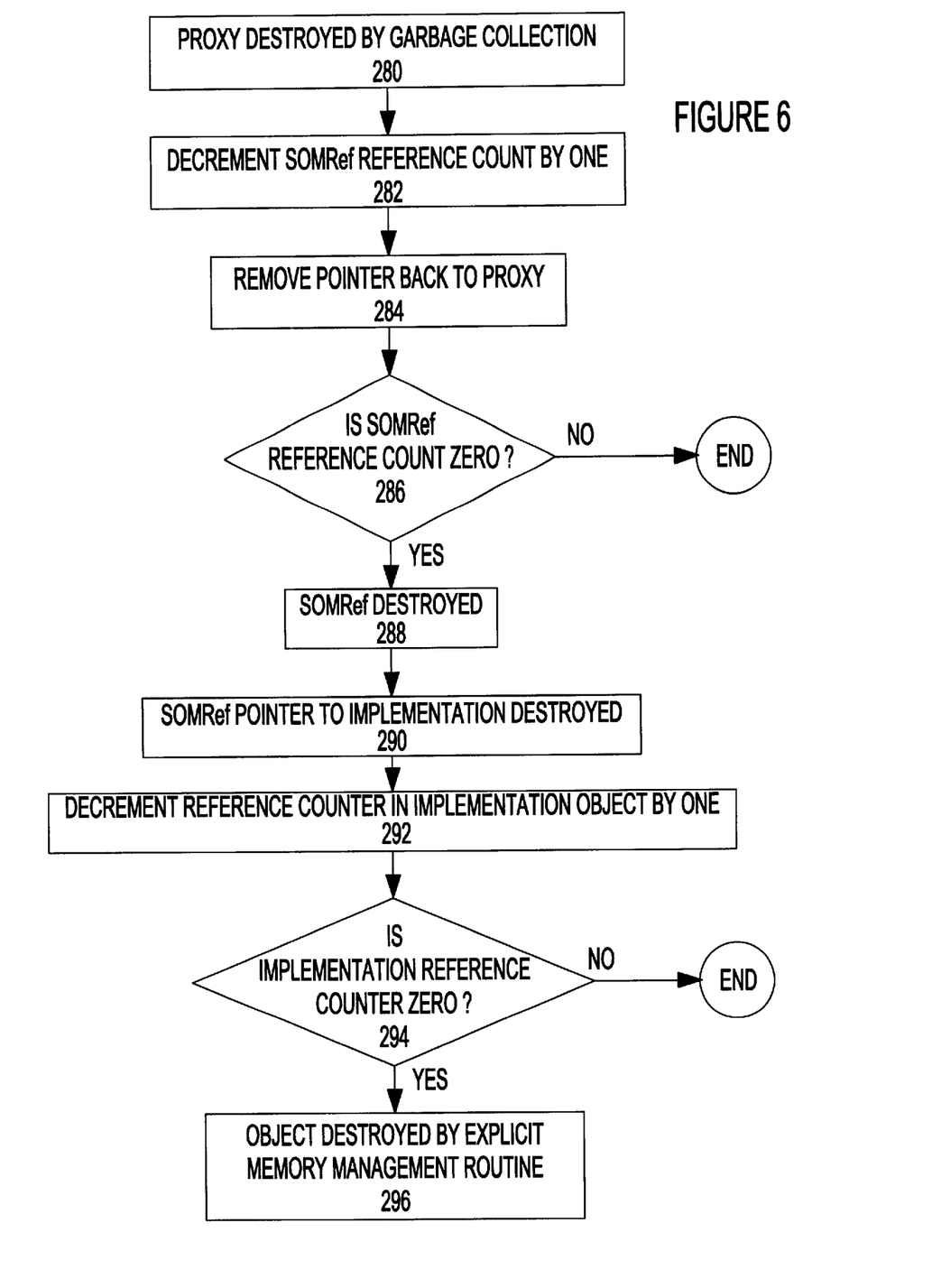

In FIG. 6, the normal destruction of the Java proxy by garbage collection (block 280) activates its finalize ( ) method, which causes the SOMRef reference count to be decremented by one and the pointer back to the proxy removed (blocks 282, 284). If this causes the SOMRef reference count to go to zero, the SOMRef is destroyed, and with it, its pointer to the implementation (blocks 286, 288, 290). As is pointer is a strong reference, its destruction decrements the reference counter in the implementation object to which it refers (block 292). Once the reference count in an implementation object in a explicit memory management domain such as C++ reaches zero, the object is available for destruction (blocks 294, 296).

By these means the present invention achieves the following. A Java SOM Proxy 34 is disposed when no clients 46 refer to it; weak references 40 from the SOMRef 38 do not interfere with this process. A SOMRef 38 is disposed when no proxies 34 refer to it and the creation of no new proxy for it is anticipated. A C++ implementation 44 is disposed when no SOMRefs 38 refer to it and it is not accessible from other C++ clients 48 (FIG. 4).

It will be clear to one skilled in the art that the pattern apparent in FIGS. 1 to 6, in which a reference count is maintained in the SOMRef which counts the total number of proxies and new proxies whose creation is anticipated, where the SOMRef contains a set of weak back references to its proxies and a single strong reference to an implementation, and where the disposal of a proxy also involves removing its pointer from the set of pointers maintained in the SOMRef, is a pattern that may be freely extended to encompass more languages and memory management domains, as long as the memory management domains are either garbage collected or reference counting domains.

Figure 7:
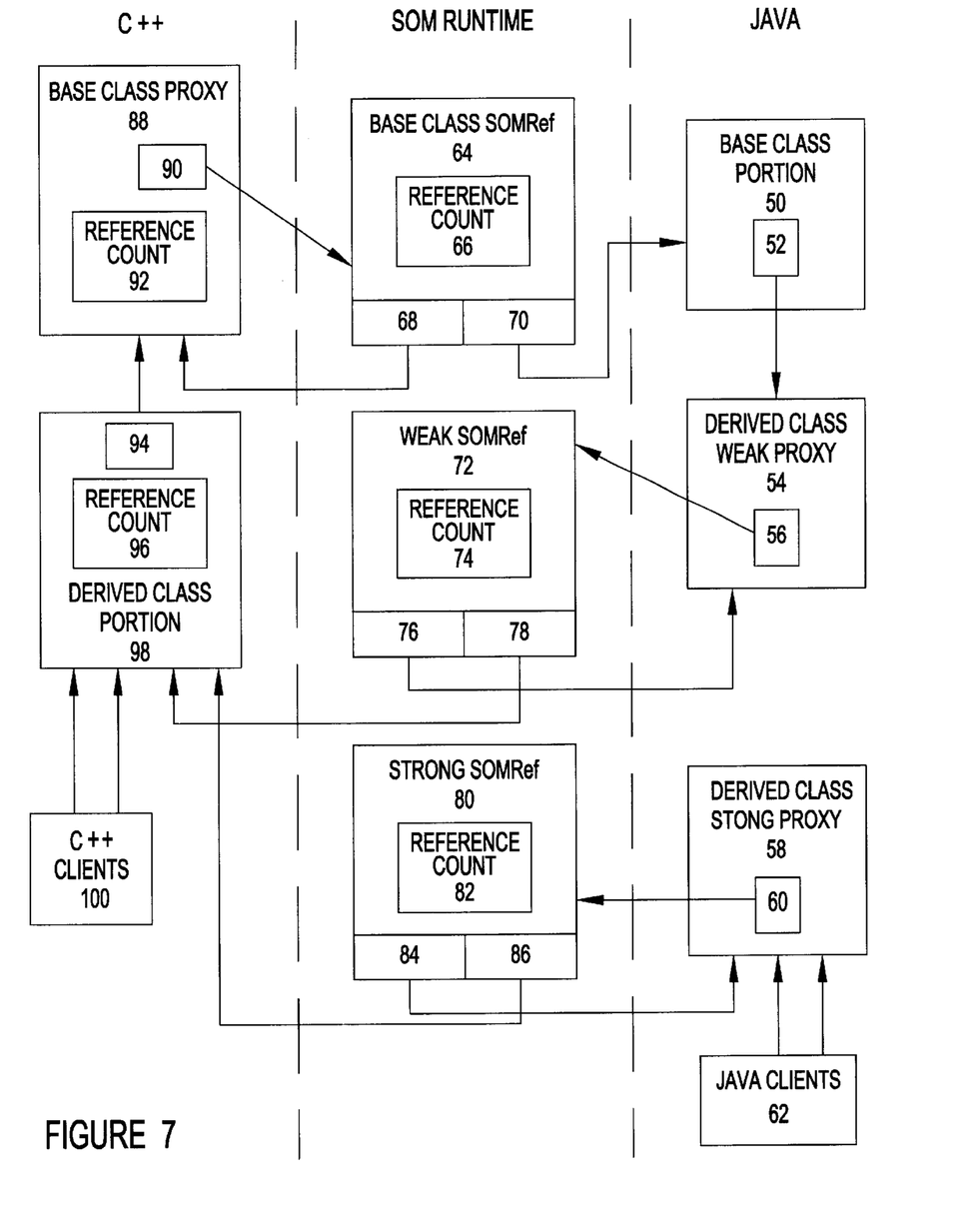
FIGS. 7 and 8 are alternate schematic diagrams illustrating the interfaces for constructing composite objects partly in an explicit memory management domain and partly in a garbage-collected domain.

FIG. 7 schematically illustrates a structure for a composite object implementation, constructed partly in C++ and partly in Java, so as to simulate inheritance of implementation across languages. A portion 50 of the composite object implementation is the base class portion, shown here as being provided in Java, and a second portion 98 is the derived class portion, shown in the figure as being provided in C++. The interface presented to clients 100 by the C++ derived class portion 98 includes all the methods presented by the Java base class portion 50, thereby simulating the derived class to base class relationship that commonly obtains in the prior art within a single object oriented programming language domain. It will be clear to one skilled in the art that the roles of the Java and C++ languages may be interchanged, and that any two languages may fulfill the roles of base class portion language and derived class portion language.

C++ clients 100 invoke methods of the C++ derived class portion 98, which provides implementations of all methods in the derived class interface. The derived class method implementations for methods that are not also present in the base class interface provide an implementation in the usual way. The derived class method implementations for methods that are also present in the base class interface may, at the option of the derived class implementor, invoke the base class method implementation through a proxy reference 94 to a C++ SOM proxy 88, which option simulates a single-language derived class that does not override a base class method. Alternatively, at the option of the derived class implementor, the derived class method implementations may provide a distinct implementation that does not delegate to the base class implementation, which option simulates a single-language derived class that overrides a base class method.

The C++ derived class portion 98 contains a reference count field 96 that is incremented and decremented as in the prior art when references from C++ clients 100 are created and destroyed. It will be described later how, according to the present invention, reference count field 96 is also adjusted to reflect the references 78 and 86 to the implementation held by the SOMRefs 72 and 80.

The C++ base class proxy object 88 contains a reference count field 92 which contains the value 1 for the lifetime of the composite object. This occurs because the reference 94 is the only C++ reference held to proxy object 88.

Proxy object 88 contains a reference 90 to a base class SOMRef 64. This SOMRef contains a set of pointers 68 to proxies, but these pointers are weak references and do not contribute to the value of the reference count field 92 in the proxy object 88. Base class SOMRef 64 also contains a strong reference 70 to the Java base class implementation portion 50. The SOMRef 64 also contains a reference count 66 which contains the value 1 for the lifetime of the composite object, because only the base class proxy 88 ever refers to this SOMRef.

By these means, when it occurs in the course of execution of the containing application program that there are no outstanding strong references to the derived class portion 98, its reference count 96 will have been reduced to zero by the reference counting discipline of the prior art. This will trigger the destruction of the derived class portion 98, releasing the strong reference 94, which will reduce to zero the reference count 92 in the base class proxy object 88. This event in turn triggers the destruction of the base class proxy object 88, releasing the strong reference 90, which will reduce to zero the reference count 66 in the base class SOMRef 64. This event in turn triggers the destruction of the base class SOMRef 64, releasing the strong reference 70, which then no longer prevents the garbage collector of the Java language domain from collecting the base class portion 50.

The base class portion 50 also contains a strong reference 52 to a Java derived class weak proxy object 54. This reference 52 is used within the implementation of the base class portion 50 as the receiver of any method invocations that are directed at the composite object. The reference 52 is therefore used in the manner that the "this" reference would be used in the base class portion of a single-language C++ or Java composite object.

The weak proxy object 54 is identical to an ordinary proxy object except that its contained strong reference 56 points to a weak SOMRef 72 instead of to an ordinary SOMRef. The weak SOMRef 72 is identical to an ordinary SOMRef except that its contained implementation pointer 78 is a weak reference instead of a strong reference, and as a consequence pointer 78 does not influence the reference count field 96 of the derived class portion 98. By this means the Java base class portion 50 is able to hold a reference 52 that leads back to the C++ derived class portion 98 without interfering with the reference counting mechanism's ability to detect when there are no outstanding references to the derived class portion 98. The problem so avoided is well known in the prior art as the problem of circular reference structures in a reference counting memory management domain.

Also according to the present invention, when the base class portion 52 has occasion to pass a reference to the composite object to some other Java code 62 it does not pass its reference 52 to the derived class weak proxy object 54, but rather invokes a method on that weak proxy object that causes the weak proxy object to duplicate itself as a derived class strong proxy object 58. This method, named "_strongproxy( )" in the preferred embodiment, invokes a function in the SOM Runtime which creates a strong SOMRef 80. The strong SOMRef 80 is a duplicate of the weak SOMRef 72 except that its implementation pointer 86 is a strong reference and therefore causes the reference count field 96 of the derived class portion 98 to be incremented. The derived class weak proxy method then constructs the derived class strong proxy object 58 and causes it to refer to the strong SOMRef 80. Finally the base class portion 50 passes a reference to the strong proxy object 58 on to the Java clients 62.

By these means, the value of the reference count field 96 in the derived class portion 98 is either the total number of C++ clients 100, if there are no other Java clients 62 that refer to the composite object, or one greater than that total if there do exist other Java clients 62. If the other Java clients release their references to the strong proxy object 58 then strong proxy object 58 will be found by the garbage collector to be unreferenced, and will first be finalized, and then its storage reclaimed. The finalization of the strong proxy object 58 involves unhooking it from the strong SOMRef 80, which causes the reference count 82 of the strong SOMRef 80 to decrement. If reference count 82 subsequently reaches zero, the strong SOMRef 80 is disposed, and this releases its strong reference 86. That in turn decrements the reference count field 96 of the derived class portion 98.

Therefore, the reference count field 96 will be non-zero if there exist any C++ clients 100 or Java clients 62 that hold references to the composite object. Conversely, the reference count field 96 will reach zero if there are neither C++ clients nor Java clients holding references. The latter condition will then trigger a memory management function on the derived class object 98, and this function may optionally perform any activities that are required prior to reclaiming the storage of an object by the instance management protocols of the program, as known from the prior art. The memory management function then reclaims the derived class object 98, leading to a cascade of strong reference releases and object reclamations, resulting in the storage reclamation of objects 88, 64, 50, 54, and 72.

Figure 8:
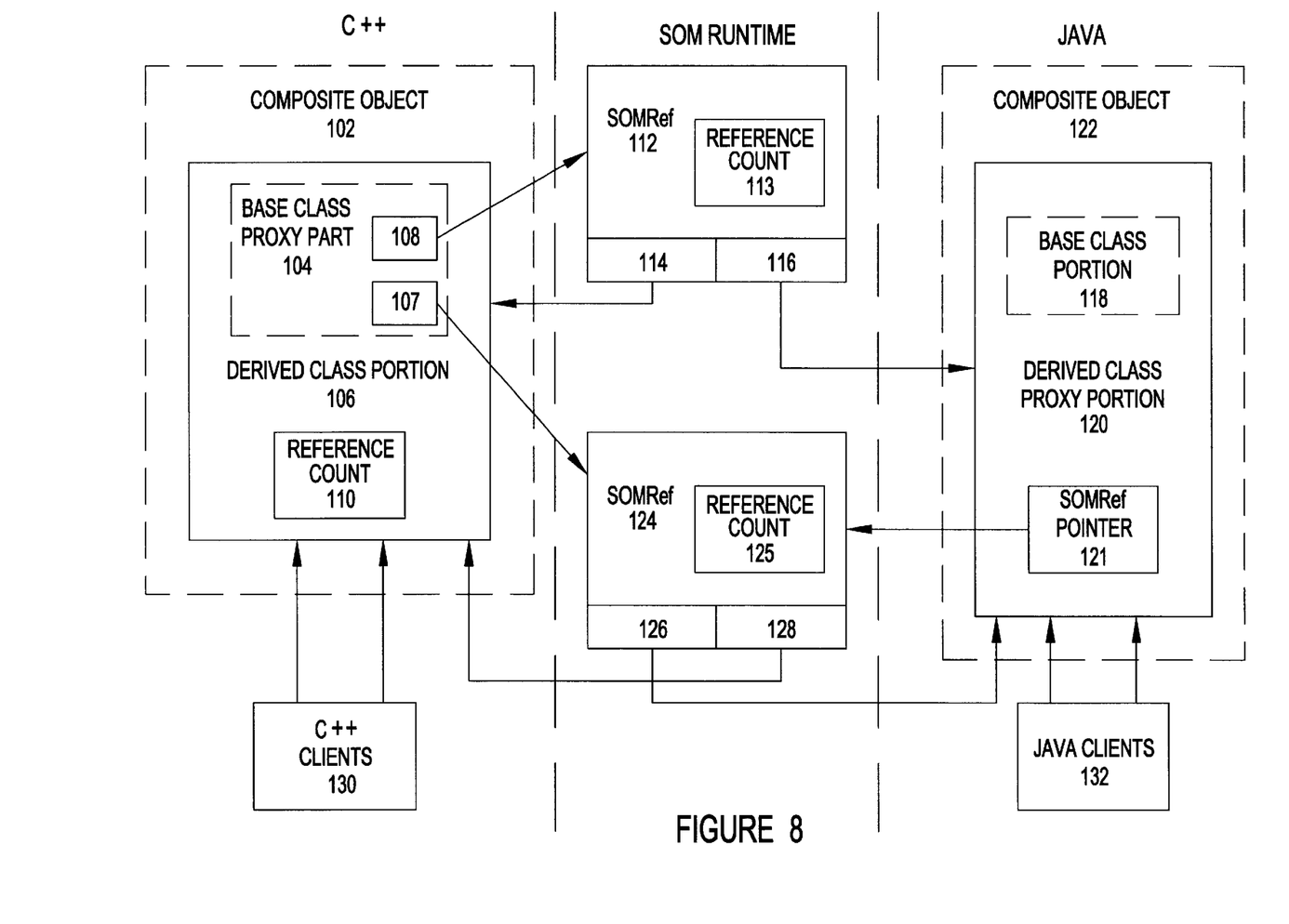

FIG. 8 schematically illustrates an alternate construction of a composite object implementation, constructed partly in C++ and partly in Java, so as to simulate inheritance of implementation across languages. This alternate construction improves over that of FIG. 7 by permitting the programmer of the Java base class object to program that object in a more natural and less constrained fashion. Specifically, the programmer of the Java base class object in FIG. 8 may freely use the Java language "this " reference when referring to the composite object, and may pass the "this" reference to other Java clients that require a reference to the composite object.

A condition for using the alternate construction illustrated in FIG. 8 is that the language environment in which the base class object is implemented must supply a way to invoke a method implementation supplied by an object's base class, even if that implementation is overridden in a derived class. The means to accomplishing this vary between programming languages and even between realizations of the same programming language. In C++, a language feature called a "qualified call" serves this purpose as exemplified below:

```
class Base {
   public:
      virtual void m( );
};
class Derived : public Base {
   public:
      virtual void m( );
};
void t( Derived * dp ) {
   dp—>Base::m( );        // Invokes "m" from class
                          // Base even though it is
                          // overridden in Derived.
}
```

Within the Java language, the language construct "super" provides a similar capability but only from within the target object, so an extra method must be introduced to exploit it:

```
class Base {
   public void m( ) { };
};
class Derived extends Base {
   public void m( ) { };
   public void base_m( ) { super.m( ); };
```

```
   static void t( Dervied d ) {
      d.base_m( );         // calls "m" from Base (indirectly)
                           // even though it is overridden.
   };
```

Java implementations also provide a means of performing this call from outside the language, namely the "CallNonvirtualMethod" function which was made part of the Java Development Kit API Documentation for Java version 1.1, published by Sun Microsystems, inc., 1997.

In FIG. 8, the C++ composite object 102 replaces the base class proxy and derived class portion objects of the previous figure. Composite object 102 is formed by having the derived class portion 106 subclass the base class proxy 104. According to the C++ language, composite object 102 contains both the base class proxy 104 and the derived class portion 106, and moreover, C++ clients 134 that invoke methods of the composite object 102 will invoke either methods of the base class proxy or of the derived class portion. For methods that are not present in the base class interface, the derived class implementation is invoked. For methods that are present in the base class interface and not overridden in the derived class portion, the base class proxy methods will be invoked. For methods that are overridden in the derived class portion, the derived class implementation will be invoked. At the option of the derived class implementor, the execution of the derived class implementations may include invoking the base class proxy methods, using for this purpose the postulated language-specific means such as a qualified call or a "super" construct.

Composite object 102 contains a strong reference 108 to a SOMRef 112, and the base class proxy methods of the composite object 102 use this reference 108 and SOMRef 112 to forward method calls to the Java composite object 122. SOMRef 112 contains a set of proxy pointers 114, which are weak references, and an implementation reference 116 which is initially a strong reference. Composite object 102 also contains a weak reference 107 to a second SOMRef 124, whose implementation pointer 128 refers back to composite object 102. This second reference 107 is the one that is inspected whenever a reference to the C++ object is passed through the SOM runtime (block 250 in FIG. 5).

The methods of the base class proxy 104 of the C++ composite object 102, in conjunction with the SOM Runtime and SOMRef 112, use language-specific means to invoke the methods of the Java base class portion 118 of Java composite object 122, even if said methods are overridden in the composite object. The methods of the Java base class portion 118 are defined by the base class implementor and are not prescribed by the present invention.

Composite object 122 presents the same interface as does the C++ composite object consists of SOM proxy methods, and contains a strong reference 121 to a second SOMRef 124. Methods implemented in the Java derived class portion 120 of Java composite object 122 perform the function of a Java SOM proxy, and in conjunction with the SOM Runtime and SOMRef 124, invoke the methods of the C++ composite object 102. This is true of all method implementations in the derived class portion 120, whether the methods are introduced in the derived class or whether they override methods from the base class portion 118.

SOMRef 124 contains a set of weak references to proxies 126 and a strong reference 128 to the C++ composite object 102.

C++ clients 130 invoke methods on the C++ composite object 102. The method invoked may be a base class proxy method from the base class proxy portion 104, or a derived class method from the derived class portion 106. If a base class proxy method is called, either directly or indirectly, it forwards the call through the SOM Runtime to the corresponding method in the Java base class portion 118 of the Java composite object 122. By this means the C++ clients 130 interact with a composite object with the appearance and behavior of a Java base class portion 118 combined with a C++ derived class portion 106.

The C++ composite object 102 may also invoke methods on itself using the C++ "this" reference. Such method invocations also invoke either a base class proxy method from the base class proxy portion 104, or a derived class method from the derived class portion 106. As before, if a base class proxy method is called, either directly or indirectly, it forwards the call through the SOM Runtime to the corresponding method in the Java base class portion 118 of the Java composite object 122. By this means the C++ composite object 102 interacts with itself as a composite object with the appearance and behaviour of a Java base class portion 118 combined with a C++ derived class portion 106.

Java clients 132 invoke methods on the Java composite object 122. The method invoked may be a base class method from the base class portion 118, or a derived class proxy method from the derived class proxy portion 120. If a derived class proxy method is called, it forwards the call through the SOM Runtime to the corresponding method in the C++ derived class portion 106 of the C++ composite object 102. By this means the Java clients 132 interact with a composite object with the appearance and behaviour of a Java base class portion 118 combined with a C++ derived class portion 106.

The Java composite object 122 may also invoke methods on itself using the Java "this" reference. Such method invocations also invoke either a base class method from the base class portion 118, or a derived class proxy method from the derived class proxy portion 120. As before, if a derived class proxy method is called, it forwards the call through the SOM Runtime to the corresponding method in the C++ derived class portion 106 of the C++ composite object 102. By this means the Java composite object 122 interacts with itself as a composite object with the appearance and behaviour of a Java base class portion 118 combined with a C++ derived class portion 106.

C++ composite object 102 contains a reference count field 110 whose value equals the number of C++ clients 130 that hold strong references to the composite object, plus one for the strong reference 128 held by the second SOMRef 124. SOMRef 112 contains a reference count field 113 that contains the value 1 for the lifetime of the composite object. SOMRef 124 contains a reference count field 125 that also contains the value 1 for the lifetime of the composite object.

According to this variation of the present invention, the protocol for managing the reference count field 110 is modified. When the value of reference count field 110 decreases to one, indicating that the number of C++ clients 130 is zero, a function provided by the SOM runtime is invoked with reference 108 to SOMRef 112. This function causes the reference 116 held in SOMRef 112 to be converted from a strong reference to a weak reference. When this situation is in effect, the composite object is said to "be in the prepared state".

A composite object that is in the prepared state may return to the normal state if a C++ client 130 acquires a strong reference to the C++ composite object 102. The creation of a new strong reference will cause the value of reference count field 110 to increase to 2; this increase triggers the invocation of a second function provided by the SOM runtime that undoes the previous change, converting reference 116 back from a weak reference to a strong reference.

However, a composite object in the prepared state may also have no Java clients 132 with references to the composite object. If there are no strong references to Java composite object 122 from Java clients 132, and the reference 126 is weak (as it always is), and the reference 116 is also weak (as it is if the composite object is in the prepared state), then the garbage collector of the Java garbage collection domain may identify the Java composite object 122 as unreferenced.

Before reclaiming any storage, the garbage collector will perform a finalization operation on the object 122. According to the present variation of the present invention, a finalization function is provided in the derived class proxy portion 120. This finalization function may optionally perform or cause to be performed any activities, unspecified by the present invention, that are required prior to reclaiming the storage of an object by the instance management protocols of the program. If the said required activities are considered by the implementor to not be long-running, they may be performed directly by the finalization function. If the required activities are long-running, the finalization function first resurrects the object 122 then initiates the long-running activities. In the preferred embodiment, object 122 is resurrected by making reference 116 strong again, although it is obvious to one skilled in the art that object 122 can be resurrected by creating a strong reference to it anywhere, including within SOMRef 124.

When the said required activities have completed, reference 121 is released which causes reference count 125 to go to zero. SOMRef 124 is then reclaimed, releasing strong reference 128 which causes reference count 110 to go to zero. This frees C++ composite object 102, releasing reference 108 and thereby SOMRef 112. Java object 122 is now unreferenced and its finalization is complete, and so it is available for storage reclamation by the garbage collector.

Also within the intended scope of this invention are modifications in which the garbage collector provides notification other than (or in addition to) finalization of object 122 when that object is found to be unreferenced. This notification, however provided, will be used to trigger the release of reference 121 and the subsequent cascade of object freeing and reference releasing, culminating in the storage reclamation of object 122.

Modifications to the invention which would be obvious to the person skilled in the art are intended to be covered in the scope of the appended claims.

The embodiments of the invention in which an exclusive property or privilege is claimed are defined as follows:

1. A cross-language memory management system for use in an object oriented programming environment, comprising: an explicit memory management domain in which reference counting is used to reclaim memory blocks; an implicit memory management domain in which garbage collection is used to reclaim memory blocks; and interface mechanism connecting the explicit memory management domain and the implicit memory management domain for detecting cross-language references between the explicit and implicit memory management domains intended for implementation objects in said domains and, in the case of any implementation object in the implicit memory management domain targeted by an existing cross-language reference from the explicit memory management domain, maintaining at least one strong reference to that implementation object.

2. The cross-language memory management system, according to claim 1 wherein for any implementation object targeted by at least one cross-language reference, the interface mechanism comprises a reference object containing a reference count of cross-language references intended for that implementation object and, while the reference count is non-zero, the reference object maintaining a strong reference to its implementation object.

3. The cross-language reference according to claim 2 wherein the interface mechanism is in an explicit memory management domain adapted to:
  create a new reference object with its reference count set initially at one on detecting a cross-language reference intended for an implementation object referenced by no previously-existing reference object; and
  destroy a reference object when its count reaches zero.

4. The cross-language memory management system, according to claim 2, further comprising means for creating and maintaining in each domain, proxy objects for cross-language references invoked by client objects in that domain, a proxy object being adapted to connect a client object to a reference object.

5. In an object oriented programming environment permitting cross-language invocations from an explicit memory management domain in which reference counting is used to destroy objects and reclaim memory blocks to an implicit memory management domain in which garbage collection is used to destroy objects and reclaim memory blocks, a mechanism to control object destruction, comprising:
  means for passing a strong reference from a calling object in the explicit memory management domain to an implementation object called by the calling object in the implicit memory management domain; and
  means for destroying the strong reference upon destruction of the calling object.

6. The mechanism, according to claim 5, further comprising a proxy object invoked by the calling object, and wherein the means to pass the strong reference comprises means to pass a pointer in the implicit memory management domain to the implementation object.

7. The mechanism, according to claim 6, wherein:
  the proxy object is in the explicit memory management domain and includes a reference counter adapted to count invocations on the proxy object; and
  wherein the means to destroy the strong reference comprise explicit memory management routines when the reference counter in the proxy object is zero.

8. In an object oriented programming environment permitting cross-language invocations from an implicit memory management domain in which garbage collection is used to destroy objects and reclaim memory blocks to an explicit memory management domain in which reference counting is used to destroy objects and reclaim memory blocks, a mechanism to control object destruction, comprising:
  means for incrementing a reference count in an implementation object in the explicit memory management domain invoked by a calling object in the implicit memory management domain;
  means for returning a weak reference to the calling object; and
  means for decrementing the reference count upon destruction of the calling object.

9. The mechanism, according to claim 8, further comprising a proxy object invoked by the calling object, and wherein the means to increment the reference count comprises means to pass a pointer in the explicit memory management domain to the implementation object.

10. The mechanism, according to claim 9, wherein the proxy object is in the implicit memory management domain and the means to decrement the reference count include destruction of the proxy object.

11. A method for implementing a cross-language call from a client between an implicit memory management domain in which garbage collection is used to reclaim memory blocks and an explicit memory management domain in which reference counting is used to reclaim memory blocks, comprising:
  invoking a method for the call on a proxy object permitting cross-language access;
  converting the method to a language-independent token having a reference count of at least one;
  selecting a pointer for invoking an implementation side mechanism; and
  receiving a return value at the client.

12. A method, according to claim 11, wherein the step of receiving a return value comprises:
  receiving as a return value a reference to a cross-language object;
  incrementing a reference count in a language-independent token for the cross-language object;
  converting the return value to the language-independent token; and
  locating a proxy for the reference to the cross-language object.

13. A method, according to claim 12, wherein the step of locating a proxy for the cross-language object comprises:
  locating an existing proxy for the cross-language object and decrementing the reference count in the language-independent token for the cross-language object;
  or, if no proxy currently exists for the cross-language object, creating a proxy.

14. A method, according to claim 12 further comprising implementing memory management when the client releases the proxy object permitting cross-language access, including the steps of:
  decrementing the reference count in the language-independent token when the proxy object is destroyed; and
  destroying the language-independent token when its reference count reaches zero, thereby destroying the pointer to the implementation side mechanism.

15. A computer program product for implementing a call from an client between a programming environment in which garbage collection is used to reclaim memory blocks and an implementation in a programming environment in which garbage collection is not used to reclaim memory blocks, said computer program product comprising:
  a computer readable storage medium having computer readable code means embodied in said medium, said computer readable code means comprising:
  computer instruction means for invoking a method for the call on a proxy object permitting cross-language access;
  computer instruction means for converting the method to a language-independent token having a reference count of at least one;
  computer instruction means for selecting a pointer for invoking an implementation side mechanism; and
  computer instruction means for receiving a return value at the client.

16. A composite object constructed over at least first and second object oriented language environments, one of said environments having explicit memory management using reference counting to reclaim memory blocks and the other one of said environments having implicit memory management using garbage collection to reclaim memory blocks, comprising:

- a first class hierarchy for the composite object constructed in the first environment having a proxy base class and at least one derived implementation object;
- a second class hierarchy for the composite object constructed in the second environment having a base implementation class and at least one proxy derived class; and
- an interface mechanism for detecting a cross-language reference from a proxy class in the composite object and to select a pointer to a corresponding implementation class;
    - wherein when a method invoked on the composite object in one of the language environments executes on a proxy class, that proxy class invokes a cross-language method on its corresponding implementation class in the second environment.

17. The composite object constructed according to claim 16 wherein at least one proxy derived class contains a reference to a weak reference object in the interface mechanism, and the second class hierarchy includes a cloned proxy derived class containing a reference to a strong reference object in the interface mechanism, said cloned proxy derived class being constructed when a client in the second environment acquires a reference to the composite object.

18. The composite object constructed according to claim 16 where, in the case of a derived proxy class invoking a cross-language method, means for maintaining the pointer selected by the interface mechanism as a weak reference.

19. The composite object constructed according to claim 18 wherein, when the first environment is explicitly memory managed and said at least one derived implementation class contains a reference count, means to change the pointer to a weak reference when the reference count reaches one.

* * * * *